INVENTORS
Warren G. Bopp,
BY Theodore F. Knapp, &
Melvin L. Ollman

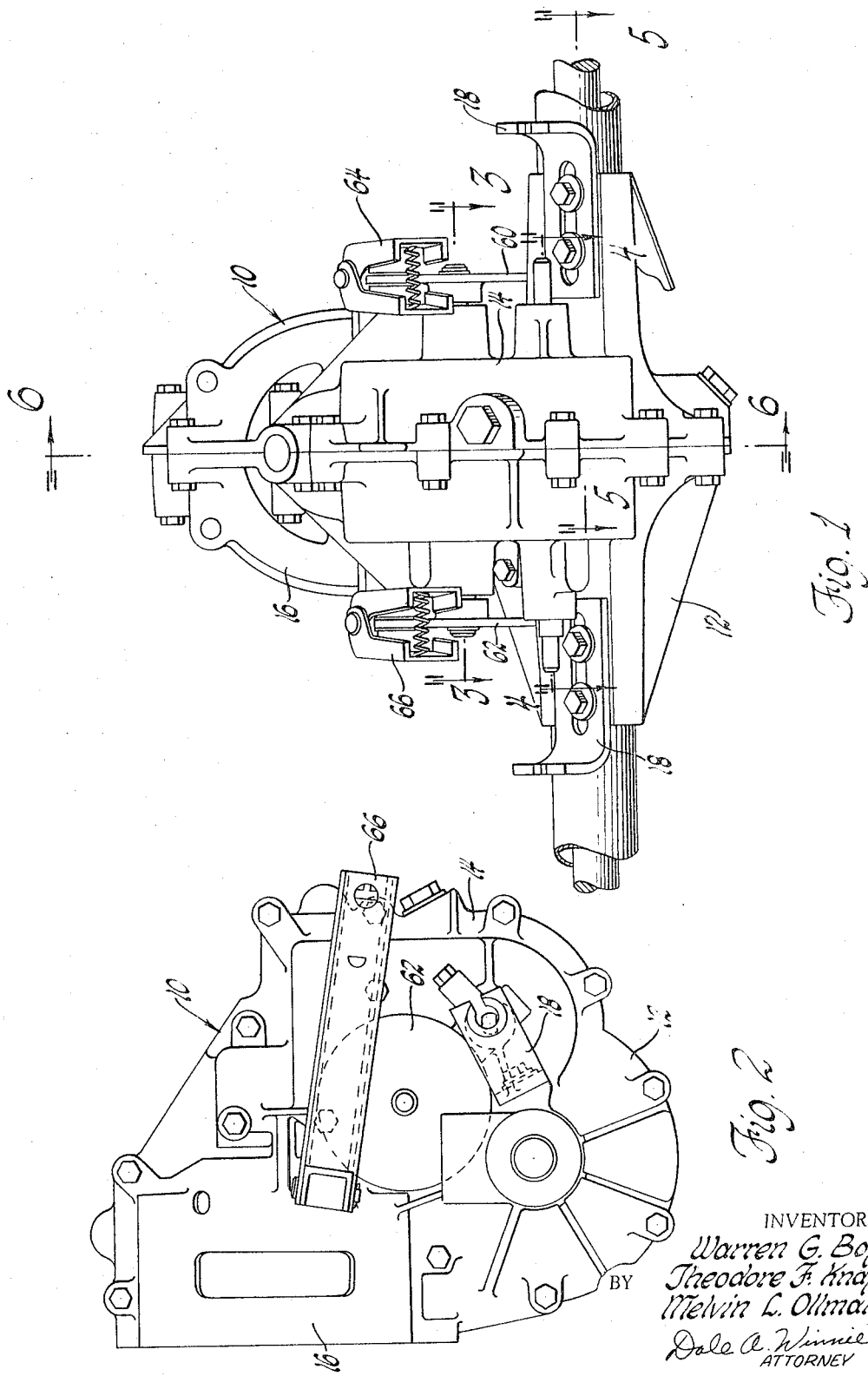

Dale A. Winnie
ATTORNEY

INVENTORS
Warren G. Bopp,
Theodore F. Knapp, &
Melvin L. Ollman
BY
Dale A. Winnie
ATTORNEY

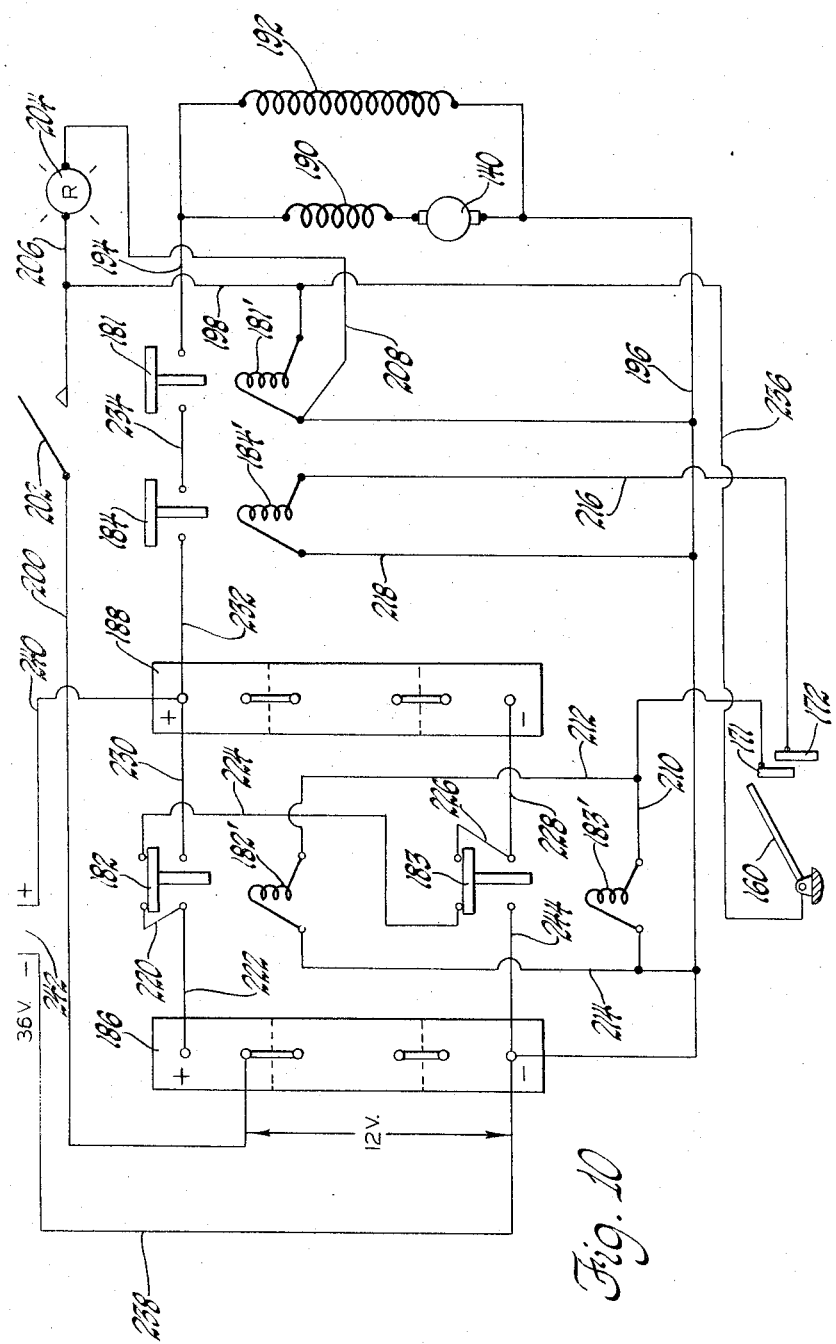

United States Patent Office 3,300,698
Patented Jan. 24, 1967

3,300,698
TRANSAXLE ASSEMBLY FOR ELECTRIC MOTOR AND GAS ENGINE DRIVEN GOLF CARTS
Warren G. Bopp and Theodore F. Knapp, Farmington Township, Oakland County, and Melvin L. Ollman, Detroit, Mich., assignors to Dura Corporation, Oak Park, Mich., a corporation of Michigan
Filed Dec. 16, 1963, Ser. No. 331,060
1 Claim. (Cl. 318—139)

This invention relates to transaxles in general and more particularly to transaxle assemblies including a fluid torque converter and operative means for obtaining drive from either an electric motor or a gasoline engine.

Golf carts, lawn mowers and other power operated equipment require means for transmitting torque from the drive power source to the wheel supporting axles. The combination of the torque tranmission means and the axle assembly is known as a transaxle. The choice of a gasoline engine or electric motor drive power source depends a great deal on the task to be performed, the initial expenditure available for such equipment, maintenance facilities, performance requirements, equipment of like kind in service and other factors too numerous to mention. Each drive power source is appreciated as having certain advantages or disadvantages with respect to the others, and the customer's requirements usually dictate whether a particular piece of equipment with a gasoline engine or an electric motor is ultimately purchased.

The electric motor drive power source is usually a series wound D.C. motor because of its inherent torque conversion characteristics. However, series load resistors and voltage changing circuitry are necessary to obtain acceptable accelerating characteristics with a series wound motor and there are limitations brought about by arcing in switch controls, burn-outs, and losses in efficiency.

The gasoline engine, when used as the drive power source, is usually coupled to a fluid torque converter to obtain gradual changes in speed or power output to meet varying conditions and in many instances, the fluid torque converter is made a part of the transaxle assembly.

It has suddenly become apparent that since a number of different types of vehicles can be powered by either a gasoline engine or an electric motor, the optimum in interchangeability could be achieved if a common transaxle assembly, with a fluid torque converter, could be used with both types of drive power.

Although, in retro-spect, it may seem obvious that an electric motor might be used with a fluid torque converter, as is hereinafter taught, it must be remembered that the inherent torque conversion characteristics of the series wound D.C. motor conventionally used in electrical drive systems made such a duplication of equipment serving a like purpose seem absolutely ridiculous, a needless expense, and an admission of advantage in the engine systems where torque converters were being customarily used. It was therefore an unthought of combination in any possible manner.

Necessity is often said to be the mother of invention. Without accepting or taking exception to this generalizing statement, seemingly insurmountable problems which may be termed necessity do cause one to look in forbidden and dark corners for answers that are not otherwise available and in some instances to achieve a breakthrough. In the present instance, the unobvious combination of an electric motor and a fluid torque converter has been found to produce new and unexpected results as well as for superior results to anything that might be expected even if the combination had been conceivable.

The objects of this invention will be appreciated as including the previously mentioned inconceivable combination of a D.C. motor and a fluid torque converter.

It is also an object of this invention to provide a transaxle assembly including a fluid torque converter for use with either a gasoline engine or an electric motor and to provide a suitable electrical control system in the latter instance.

It is an object of this invention to provide a transaxle and fluid torque converter assembly for use with an electric drive motor and capable of increased efficiency, smoother operation and the elimination of numerous control problems normally present in electric drive systems.

It is an object of this invention to provide a transaxle and fluid torque converter drive assembly operable by an electric motor and wherein considerable less power demands are made on the drive motor and performance changes are more smoothly attained with less complicated controls then might be expected.

It is an object of this invention to provide a drive unit including a fluid torque converter and operable by a compound wound motor rather than the conventional series wound motor with a minimization of power and with decided advantages in performance.

These and other objects and advantages to be gained in the practice of this invention will be better understood and appreciated upon a reading of the following specification in regard to a preferred embodiment of the invention and having reference to the accompanying drawings.

In the drawings:

FIGURE 1 is an end view of a transaxle assembly including a fluid torque converter.

FIGURE 2 is a side plan view of the transaxle assembly shown by the previous drawing figure.

FIGURE 8 is a plan view of the foot operated control switch used with the electric motor drive system.

FIGURE 9 is a cross-sectional view of the foot operated control switch shown by the previous drawing figure as seen in the plane of line 9—9 thereon.

FIGURE 10 is a schematic drawing of the electrical system employed with the transaxle assembly using an electric drive motor.

FIGURE 11 is a chart showing the operative sequence of certain electrical components in the electrical system last mentioned.

Figure 3:
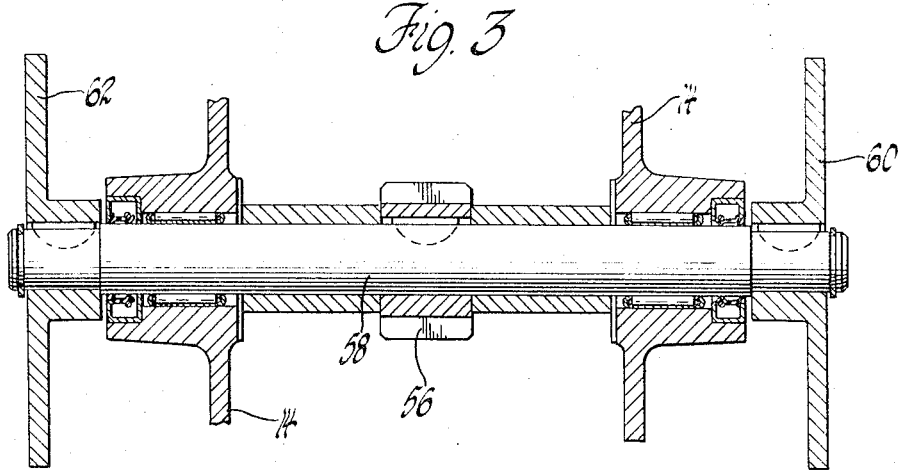
FIGURE 3 is a cross-sectional view taken in the plane of line 3—3 in the first drawing figure and showing the disc brakes and operative braking system.

The transaxle and fluid torque converter assembly 10 shown in FIGURES 1, 2, 6 and 7 includes a unitary housing having a differential and axle housing part 12, a transmission housing part 14 and a torque converter housing part 16.

Suitable adjustable brackets 18 are provided on the axle housing part 12 for mounting one end of the assembly and other means (not shown) may be provided elsewhere for like purposes.

Drive power is supplied to the transaxle and torque converter assembly 10 by either a gasoline engine or an electric motor (not shown in FIGURES 1 and 2) which is engaged to the accessible end of the torque converter housing part 16.

Figure 4:
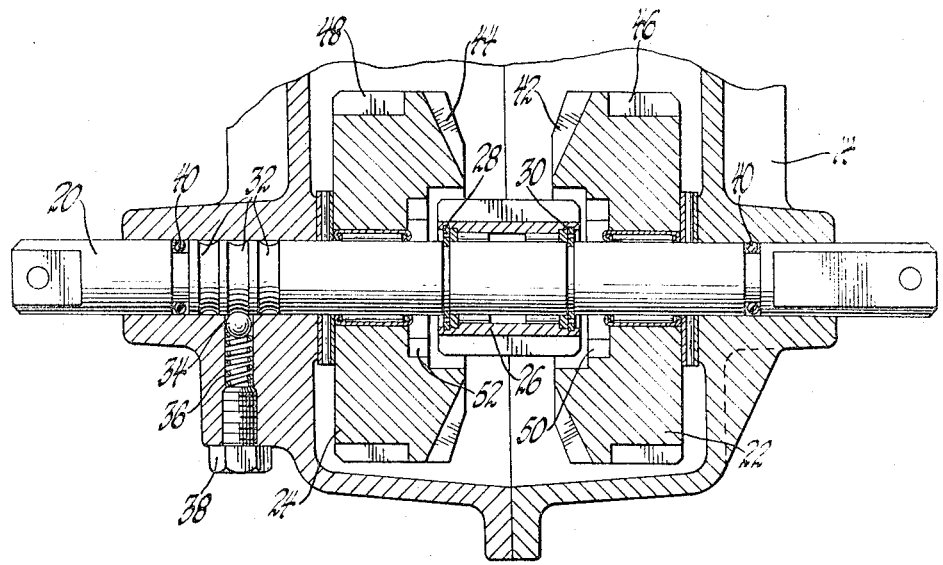
FIGURE 4 is a cross-sectional view taken in the plane of line 4—4 in the first drawing figure showing the side gear drive employed and the clutch means used therewith.

Within the transmission housing part 14, as best shown by FIGURE 4, is provided a shaft 20 which extends between the housing side walls and has a pair of bevel side gears 22 and 24 rotatably disposed thereon. A spur gear 26 is also rotatably disposed on the shaft 20 and at the same time is restrained against axial movement other than with the shaft, by a pair of split-ring retainers 28 and 30.

The shaft 20 is reciprocal back and forth through the housing walls and includes three annular grooves 32 about one end which cooperate with a ball detent 34 backed up by a spring 36 and a retainer screw 38 provided in the housing wall. Suitable O-ring seals 40 are provided about the end of the shaft 20 and other appropriate sealing means are provided about the shaft next adjacent the side gears.

The bevel gear faces 42 and 44 of the side gears 22 and 24 are receptive of a bevel drive gear, later identified therebetween. The side gears also include spur gear teeth 46 and 48 about their peripheral surface and spline teeth 50 and 52 centrally thereof and while are formed for receptive dog engagement with the spur gear depending upon which direction the gear is shifted by the shaft 20.

It will be appreciated that the side gears 22 and 24 are rotated in opposite directions and that engagement of the spur gear 26 with one or the other thereof will provide forward or reverse drive to other gear means which are engaged therewith and will be next described.

Figure 6:
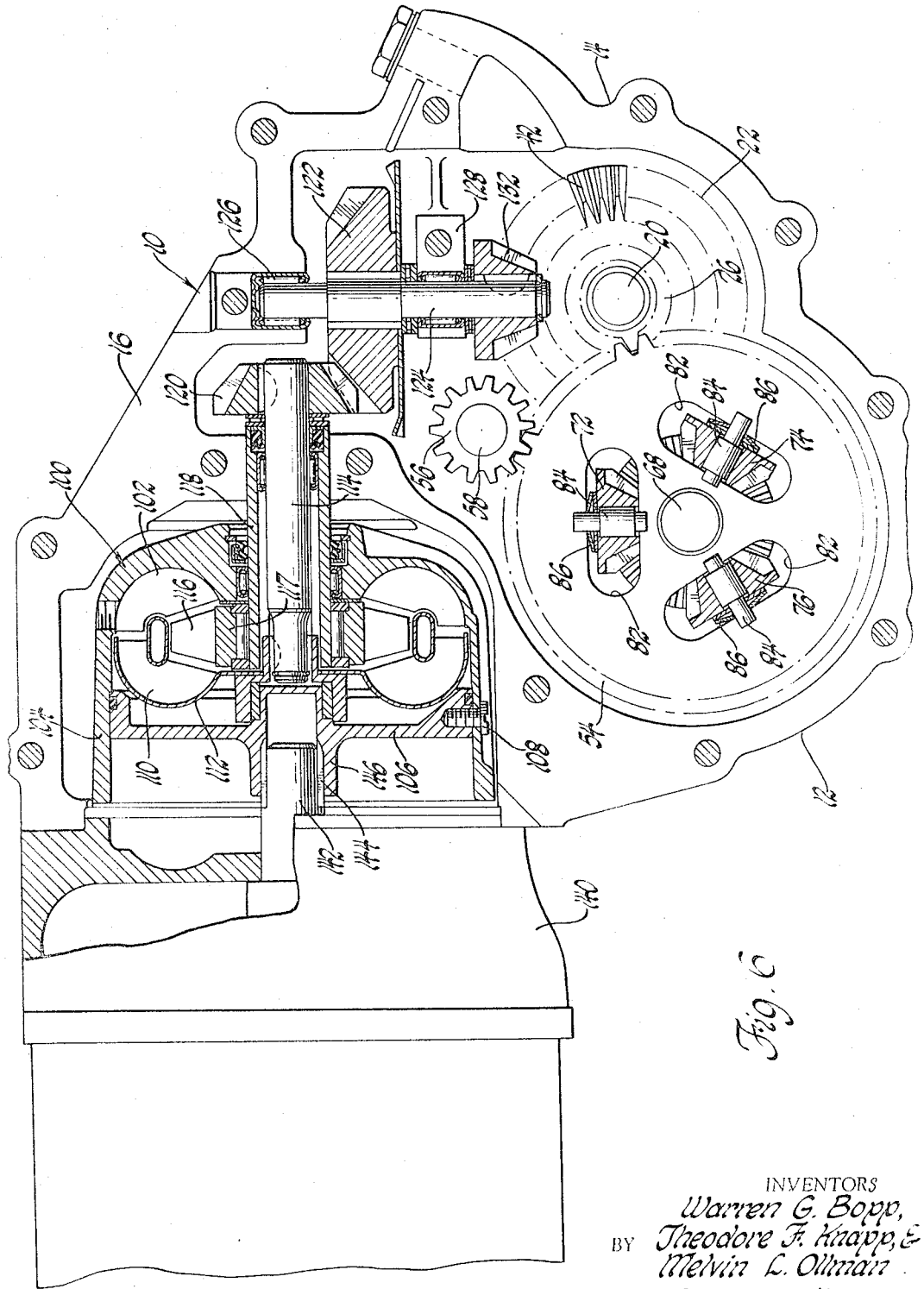
FIGURE 6 is a cross-sectional view taken in the plane of line 6—6 in the first drawing figure and showing the torque converter with an electric drive motor operatively connected thereto.

The spur gear 26 is at all times in meshing engagement with a bull gear 54, as best seen in FIGURE 6. The bull gear 54 is accordingly driven in one rotational direction or the other unless the spur gear 26 is disposed in the neutral position between the side gears 22 and 24.

Another spur gear member 56, best shown in FIGURES 3 and 6, is provided on a shaft 58 extending across the transmission housing part 14. This gear member 56 is also disposed in continuous meshing engagement with the bull gear 54 mentioned before. The spur gear 56 is keyed to the shaft 58 and the shaft is, in turn, supported for rotation with its ends extended through the housing side walls.

A pair of frictioned discs 60 and 62 are keyed to the outer disposed ends of the shafts 58 and are cooperatively disposed for engagement by friction surfaced braking means 64 and 66 disposed externally of the housing 10, and operative in a conventionally known manner.

Frictional engagement of the discs 60 and 62 inhibits rotation of the shaft 58 and the spur gear 56 keyed thereto, to, in turn, brake the bull gear 54.

Figure 5:
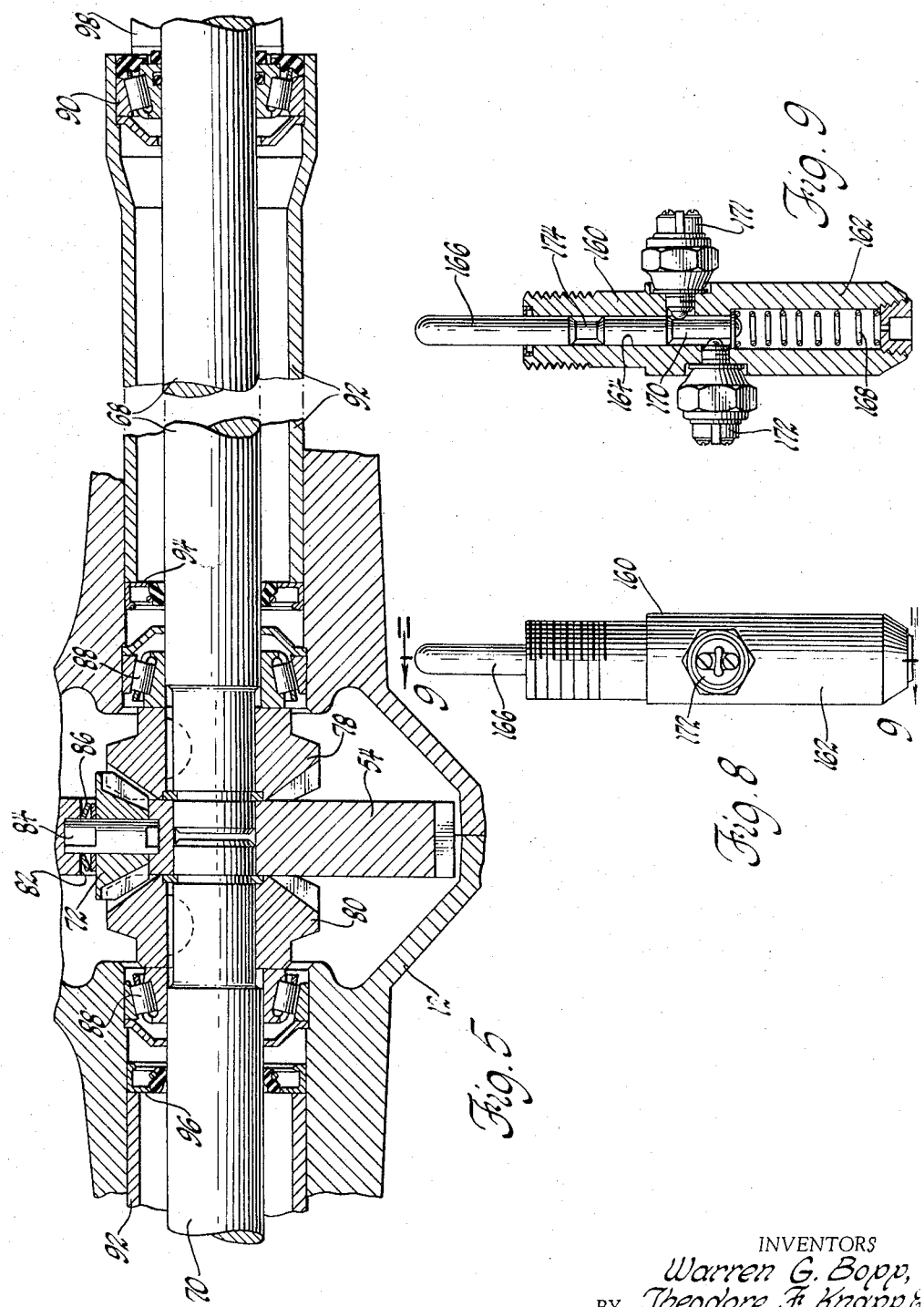
FIGURE 5 is a cross-sectional view taken in the plane of line 5—5 in the first drawing figure and showing the differential drive means operative of the axle shafts.

The bull gear 54 is disposed within the axle and differential housing part 12 and is best shown by FIGURES 5 and 6. It is mounted on the adjacently disposed and axially aligned ends of the axle shafts 68 and 70. It includes a trio of planetary bevel gears 72, 74 and 76 which mesh with bevel gears 78 and 80 provided on the adjacently disposed ends of the axle shafts. The planetary bevel gears are disposed in slots 82 provided in the bull gear and on pins 84 which extend radially thereacross. The pins are axially adjustable relative to the bull gear and the planetary bevel gears are backed up by spring washers 86 or the like to allow relative free floating drive engagement between the planetary gears and the axle shaft gears. The axle shafts 68 and 70 are rotatably supported in thrust bearings 88 and 90 at opposite ends thereof. The ends of the axle shaft tubes 92 are fitted in to the receptive ends of the housing part 12 and suitable fluid seals 94 and 96 are provided about the shafts next adjacent thereto. Wheel hubs 98 are provided on the ends of the axle shafts 60 and 70.

The transaxle assembly just described includes means of obtaining forward and reverse drive, as mentioned. Second and third forward speeds are also obtainable, though not shown herein, by the use of gear means engaged with the spur gear teeth 46 and 48 provided on the side gear members 22 and 24. Since this forms no part of this application, reference should be made to the co-pending application SN 148,064 titled Transaxle Drive Assembly for details in this regard.

Referring now to FIGURE 6:

A fluid torque converter 100 is shown in the converter housing part 16. Impeller blades 102 are part of the torque converter shell made up of walls 104 and 106 and which are secured together by bolt fasteners 108. The turbine blades 110 are provided in a shell 112 splined to the output shaft 114. The stator blades 116 are provided on a one way clutch race 117, the rollers of which roll or lock up on a sleeve 118 through which the output shaft extends.

A bevel gear 120 is keyed to the end of the converter output shaft 114 and is in turn engaged with a bevel gear 122 provided on a shaft 124 which is mounted in the transmission housing part 14. The shaft 124 has one end rotatably supported in bearing means 126 provided in the housing wall and includes an intermediate bearing support 128 below the bevel gear 122. The shaft is splined for engagement with the bevel gear 122 and has an output bevel gear 132 keyed to the lower end thereof.

The gear 132 is received between the side gears 22 and 24 to provide drive thereto.

The torque converter 100 is obviously filled with converter fluid and it will be appreciated that the differential and transmission parts 12 and 14 of the unitary housing include a common chamber area with a sump for lubricating fluid, a suitable access thereto, oil slingers, etc. as is common practice.

FIGURE 6 shows an electric motor 140 disposed next adjacent the converter housing part 16 and having the armature shaft 142 received in splined engagement as at 144 in a receptive collar 146 formed from the inner converter housing part 106 in axial alignment with the output shaft 144 and within the annular extension of the outer housing wall part 104.

Figure 7:
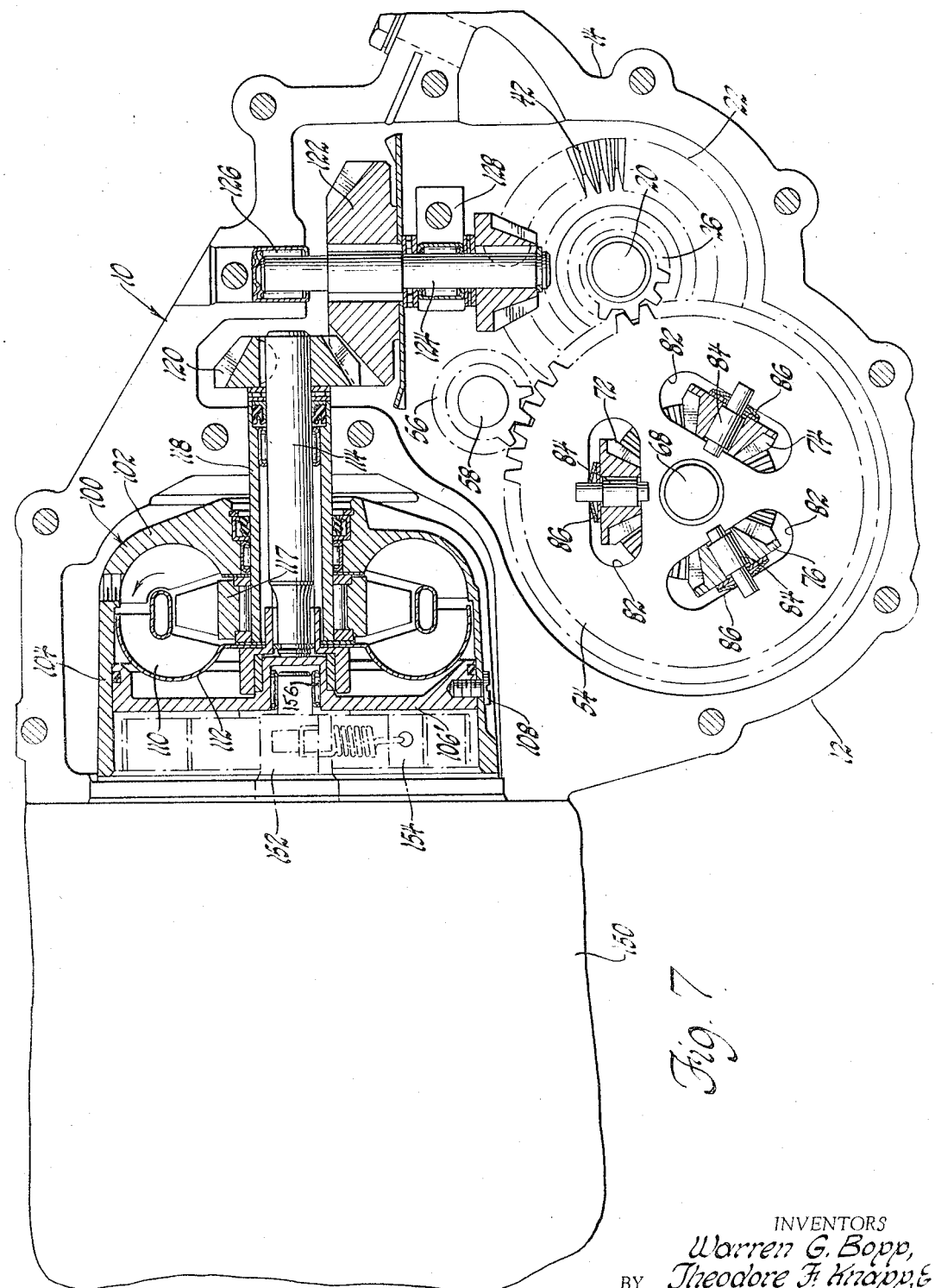
FIGURE 7 is similar to the last mentioned drawing figure and shows a gasoline engine operatively connected to the torque converter.

FIGURE 7 is similar to FIGURE 6, but shows a gasoline engine 150 having the crankshaft 152 thereof received in driving engagement with the fluid torque converter. The outer shell of the torque converter has the radial wall 106 modified, and identified 106', to exclude the collar 146 receptive of the armature shaft 142 in splined and driving engagement therewith. A centrifugal clutch 154, shown in phantom outline, is used instead and is disposed within the space enclosed by the annular flange of the outer torque converter shell wall 104.

The terminal end of the crankshaft 152 is received in a roller bearing 156 within the end wall 106'. The centrifugal clutch operating in the conventionally known manner.

The minor change in the torque converter and wall parts 106 and 106' is for conveneince of assembly and to accommodate a short armature shaft without an adapter or the like. It is obvious that the end wall 106' might include a splined recess for a longer armature shaft and that such a recess could be equally receptive of the bearing 154 which would be, in turn, receptive of the end of an engine crankshaft.

From the foregoing description it will be appreciated that the mechanical adaption of either the electrical motor 140 or the gasoline engine 150 for drive of the transaxle and torque converter assembly 10 is readily accomplished.

FIGURES 8 and 9 show a multiple position foot switch 160 operative, in part, of the electrical control system used with the motor 140.

The foot switch 160 includes a cylindrical body member 162 having a bore 164 in which is provided a plunger 166 backed up by a spring 168. The plunger is provided with elongated annular grooves 170 and 174 at spaced intervals thereon and which cooperate with detent switches 171 and 172 operative singularly and together in a manner later described.

Referring now to FIGURES 10 and 11:

The electrical controls incident to operation of the transaxle and torque converter unit of this invention by the electrical motor 140 includes only four solenoid operated contact switches; identified 181, 182, 183 and 184. The respective solenoid coils are identified by like numbers with suffix marks for correlation; namely 181', 182', 183' and 184'. The switches 182 and 183 are single pole double throw switches while the other two are single pole normally open switches.

Within the system are two sets of three 6-volt batteries; the one set being identified as 186 and the other as 188. The batteries in each set are connected together in series to provide 18 volts. However, a tap connection and parallel or series connection of the battery sets, under different operative conditions, enables 12, 18 or 36 volt power to be obtained.

The drive motor 140 is shown to include compound windings 190 and 192 which are connected by a lead 194 to one side of the contact switch 181. A power supply lead or line 196 connects the otherside of the motor to one side of the battery 186.

One side of solenoid coil 181' is connected to the power supply lead 196 while the other side thereof is connected by leads 198 and 200 to a 12-volt tap made on the battery 186. A key switch 202 is provided in the battery connecting line 200.

A pilot light 204 is conected by leads 206 and 208 across the coil 181' to indicate when the system is operative.

The foot switch 160 is disposed in the electrical system in a manner whereby it is operative of the contact switches 182, 183 and 184. Detent switch 171 is connected by leads 210 and 212 to one side of the solenoid coils 182' and 183'. The other side of these coils are connected by a lead 214 to the power line 196. Detent switch 172 is connected by a lead 216 to one side of coil 184' while the other side of the coil is connected by lead 218 to the power line 196.

Contact switch 182 is normally in closed contact with leads 220 and 222 to one side of battery 186. It is also in contact with a lead 224 to one side of the contact switch 183. The other side of contact switch 183 is normally in closed contact with leads 226 and 228 which connect to one side of battery 188. The other side of battery 188 includes leads 230 and 232 to the normally open contacts of switches 282 and 284. A lead 234 is similarly disposed between the normally open contacts of switches 184 and 181.

The other side of the foot switch 160 is connected in the circuit by a lead 236 which is connected by line 198 and through the key switch 202 and lead 200, to the 12-volt terminal of battery 186.

Battery recharge leads 238 and 240 are connected to opposite terminals of the batteries 186 and 188. The batteries are, in turn, connected in series for recharging as at 242 by leads 228, jumper 226 across contacts of switch 183, lead 224, across switch 182, and by jumper 220 and lead 222.

From the foregoing description it will be appreciated that the solenoid coils are all receptive of 12-volt power. Drive motor 140, in turn, receives either 18-volt power or 36-volt power depending upon the disposition of the foot switch 160.

The chart of FIGURE 11 is best used to follow the operational sequence of the electrical system. The chart identifies the contact switches as contactors 1–4; using only the last digit of the identifying numbers, 181–184. The detent switches 171 and 172 are similarly abbreviated as foot switches 1 and 2.

With key switch 202 inoperative, none of the contact switches or detent switches are operative. When the key switch is turned on the pilot light 204 energized along with solenoid coil 181' to close switch 181.

The motor 140 is now in a ready state, but is not receptive of any power to its windings 190 and 192 because of the open switch 184 between its lead 194 and the battery 188.

When the foot switch plunger 166 is depressed, the detent switch 171 is first to be energized. The detent switch 172 remains inactive; being still in the plunger groove 170.

When foot switch contact 171 is closed, coils 182' and 183' are energized and contacts 182 and 183 close. This places batteries 186 and 188 in parallel. However, the motor 140 is still inoperative because of the open contact switch 184.

Further depression of the foot switch plunger 166 causes detent switch 172 to be activated along with the detent switch 171. This activates the contact switch coil 184' closes the contact switch 184 and completes the circuit between the batteries 186 and 188 to the motor. The contact switches 182 and 183 remain closed, the batteries are in parallel and the motor is operative under an 18-volt system.

Further depression of the foot switch plunger 166 will cause the detent switch 171 to align with the plunger groove 174 and to be inactivated. This takes contact switches 182 and 183 out of their last mentioned position and returns them to their original positions which provides a series connection for the two batteries 186 and 188 through the contact leads 222, 230, 228 and 244. Accordingly, the system is converted to 36-volt supply for the motor 140 and greater power and speed is obtained thereby.

In review, the key switch 202 is operative of contact switch 181, the foot switch 171 controls contact switches 182 and 183, and foot switch 172 controls contact switch 184. The foot operated plunger 166 is first operative of the foot switch 171 to place the batteries 186 and 188 in parallel, then of foot switch 172 to provide the battery-to-motor connection, and lastly to change the contact switches 182 and 183 to provide a series connection between the power supplying batteries.

From the foregoing description, it will be appreciated that the transaxle assembly of this invention, including a fluid torque converter, is operative equally well by either a gasoline engine or a compound wound electric motor. The transaxle and torque converter are provided in a common housing with the torque converter disposed at the input side of the housing and receptive of either the splined armature shaft of an electric motor or for drive engagement with an engine crankshaft by means of a centrifugal clutch.

Mechanically, the unit is unique as regards its interchangeable use with either a gasoline engine or an electric motor. Further, in its use with an electric motor it is a new and novel arrangement in having a fluid torque converter as an integral part thereof.

The assembly is even further unique in making use of a compound wound motor rather than the conventionally used series wound motor, as adapted for electric drive. The necessity of series load resistors and voltage decreasing means, with the incident problems of burnt-out switch contacts, or of multiple relays to connect batteries in different series and parallel combinations for incremental voltage level changes, still using load resistors, is completely avoided.

The runaway characteristics of series wound motors in reaching for the power needed in each instance is completely avoided in the use of a compound wound motor. At the same time, the compound wound motor in combination with the fluid torque converter provides for smooth acceleration and the attainment of an equal level of power with the use of less complicated and failure prone electrical circuitry. Decidedly fewer voltage level changes are required in stepping the motor to full power with the torque converter in the system.

The circuit switching includes a fail-safe precaution in having the key switch 202 activate the contact switch 181 under minimum voltage conditions. Since this contact switch is made before parallel or full series power conditions are attained, it is not prone to arcing, freezing or burn-out failure. Should any of the other contact switches fail, the system can be inactivated by simply turning the key switch off.

The contact switch 184 is activated only after the parallel power condition is made and accordingly, is closed before the full power condition is attained. It is therefore also less prone to failure.

The remaining two contact switches 182 and 183 are activated to establish the parallel battery voltage condition before power is supplied to the motor. They are later released to establish the full power series condition but, due to the torque converter, before full load is applied to the system.

From the foregoing description of a working embodiment of this invention and a general discussion of the operation and of the attributes thereof, the teachings of this invention should be quite clear without further enumeration. Although preferred embodiments of this invention have been shown and described in detail, it will be appreciated that other innovations, modifications and variations are within the scope of the teachings set forth. Accordingly, such of these innovations, modifications and variations as are within the spirit of the invention as herein set forth and are not specifically excluded by the language of the hereinafter appended claim, are to be considered as inclusive thereunder.

We claim:

Vehicle drive means, comprising;

a transaxle assembly including a housing having a pair of axially aligned vehicle supporting and driving axles received therein, a bull gear rotatably supported on the aligned and closely disposed ends of said axles, and having planetary gears mounted on said bull gear and bevel gears on said axles for differential drive therebetween, clutch means and side gears provided in said housing and selectively engaged and connected to said bull gear, angular drive means connected to said side gears and including an input shaft disposed normal to and in spaced relation over said vehicle supporting and driving axles, a fluid torque converter provided in said transaxle housing in common with said angular drive, side gears and clutch means and operative of said input shaft, and a compound wound D.C. motor operatively connected to the input side of said torque converter and provided in an enclosure directly connected to said common transaxle and torque converter housing in compact assembly and having an electrical control circuit operative of said motor and storage batteries and means of series and parallel connection for optional torque resistant drive thereof.

References Cited by the Examiner

UNITED STATES PATENTS

| 1,324,194 | 9/1919 | Harries | 318—412 X |
| 1,423,090 | 7/1922 | Delano | 318—139 X |
| 2,254,552 | 9/1941 | Tjaarda | 318—139 |
| 2,666,876 | 1/1954 | Sinclair | 318—8 |
| 2,725,488 | 11/1955 | Hueffed et al. | 307—48 |
| 3,078,739 | 2/1963 | Weinrich | 74—720 |
| 3,117,648 | 1/1964 | Landreth | 318—139 X |
| 3,131,580 | 5/1964 | Forster | 74—720 |
| 3,134,063 | 5/1964 | Hastings | 318—139 |

FOREIGN PATENTS 252,675  1/1927  Great Britain.

ORIS L. RADER, *Primary Examiner.*

S. GORDON, G. SIMMONS, *Assistant Examiners.*